Patented May 31, 1927.

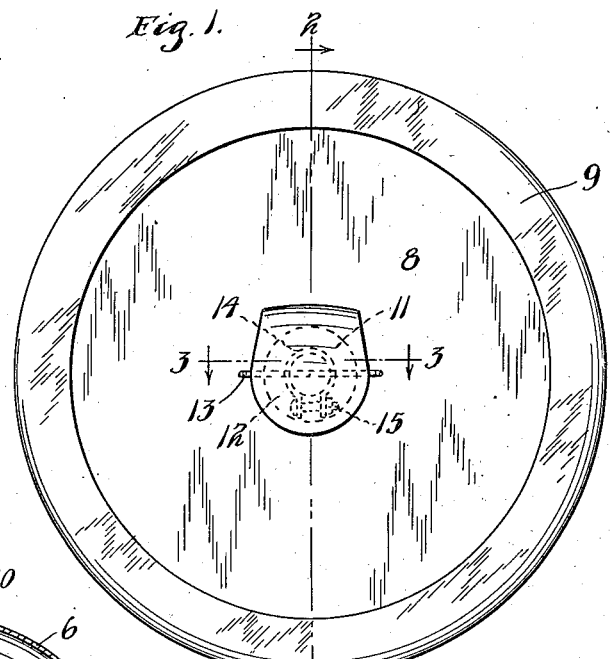
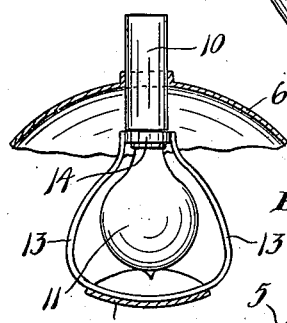
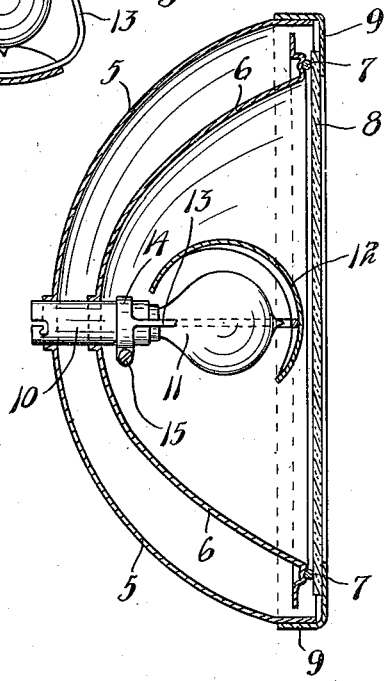
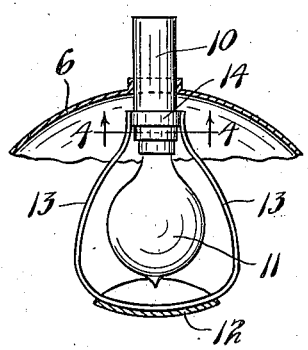
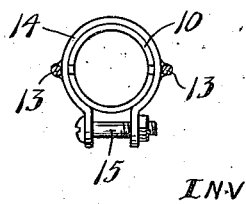

1,630,860

UNITED STATES PATENT OFFICE.

OSCAR NELSON, OF BRECKENRIDGE, MINNESOTA.

AUTOMOBILE HEADLIGHT.

Application filed October 2, 1924. Serial No. 741,127.

This invention relates to a dimmer or anti-glare device for the headlights of a vehicle, such as an automobile. As is well known, the glare from the headlights of an automobile is often very objectionable to an approaching driver and interferes with the proper driving of the latter. It is not desirable however to obstruct all of the light of the headlight as it is necessary to still have light thrown upon the road so that both cars can be safely guided thereon.

It is an object of this invention to provide a very simple and efficient means for preventing an objectionable glare from the headlight of an automobile and which will not unduly obstruct the light from the headlight.

It is a further object of the invention to provide such means comprising a comparatively narrow plate bent about the top and in the front of the lamp bulb of the headlight.

It is also an object of the invention to provide such a device as set forth in the preceding paragraph, which is easily secured to and removed from the lamp socket of the headlight and which may be disposed in various positions thereon.

It is more specifically an object of the invention to provide such a device comprising a substantially pear-shaped plate curved in substantially circular form about the top and front of the light bulb and about a horizontal axis extending substantially through the center of said bulb, said plate being also concave on its inner side in transverse cross section.

These and other objects and advantages of the invention will be fully set forth in the following description made in connection with the accompanying drawings in which like reference characters refer to the same parts throughout the different views, and in which, Fig. 1 is a view in front elevation of a headlight with the invention thereon.

Fig. 2 is a vertical section on the line 2—2 of Fig. 1, as indicated by the arrows;

Fig. 3 is a horizontal section taken on the line 3—3 of Fig. 1, as indicated by the arrows;

Fig. 4 is a horizontal section taken on the line 4—4 of Fig. 3, as indicated by the arrows; and Fig. 5 is a view similar to Fig. 3 showing a modification.

Referring to the drawings, an automobile headlight of common construction is shown comprising the outer casing 5 and the inner reflector casing 6, the latter having a grooved flange at its rim carrying a gasket 7 against which the lens 8 is held by the clamping ring 9. A lamp socket member 10 extends centrally through the casings 5 and 6 and is adapted to receive at its inner end the lamp bulb 11, all of which is of ordinary and standard construction. The headlight shown is of a type used on the well known Ford automobile.

In accordance with the present invention, plate 12 is provided which in developed plan would be substantially pear shaped. This plate has its larger end disposed in front of the bulb 11, the lower edge of the plate being substantially circular in outline and concentric with the center of said bulb. Said plate is also curved about a horizontal axis to extend over the top of the bulb, said horizontal axis passing substantially through the center of said bulb. As shown in Fig. 3, the plate is also curved in transverse cross section with its concave side directed inwardly. The plate 12 has secured thereto a pair of arms 13 which extend rearwardly and are secured to a clamping ring 14 adapted to be clamped about the lamp socket 10 by a headed and nutted screw 15. In the embodiment of the invention illustrated, the arms 13 are shown as made of one wire which extends across the inner side of said plate and is soldered or otherwise connected thereto.

In the operation of the device, the plate is connected to the lamp socket, as shown in the drawings, and preferably disposed at the top thereof, as illustrated. With this arrangement, the rays from the lamp bulb 11 which normally would be projected upwardly and shine into the eyes of a driver of an approaching vehicle are intercepted and reflected downwardly against the inner side of the reflector 6. The glare from the lamp is therefore eliminated and the light effectively dimmed without objectionably interfering with the amount of light projected therefrom. The plate 12 can, if desired, be disposed in different angular positions about the bulb to suit various reflectors and the various drivers of different machines. In all cases it will be seen that the front part of the plate 12 is directly in front of the bulb 11. The inner side of the plate 12 may be highly polished so that a light striking the same will be efficiently directed against the reflector 16 from which it will again be reflected onto the road.

In Fig. 5 the reflector is shown having its clamping ring 14 embracing and clamping the stem of the lamp bulb 11, instead of the lamp socket 10. In all other respects the parts are the same. If the attachment is carried by the bulb stem, as shown in Fig. 5, the arms 13 would, of course, be somewhat shorter than if the device is carried by the socket. The operation of the device shown in Fig. 5 is the same as that already described.

From the above description it is seen that applicant has provided a very simple and efficient device for dimming the headlight or preventing the objectionable glare therefrom. The device is easily and quickly made and installed and can be produced at low cost. The same has been amply demonstrated in actual practice and found to be very successful and efficient.

It will, of course, be understood, that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. The combination with the reflector and lamp bulb in an automobile headlight, of an anti-glare device comprising a narrow plate disposed over said bulb and curved downwardly around the front thereof, said plate being wider than the bulb and extending below the same at the front so that the bulb is entirely obscured from the front.

2. The combination with the reflector, lamp socket and lamp bulb of an automobile headlight, of an anti-glare device comprising a comparatively narrow substantially pear-shaped plate disposed over and in front of said bulb and curved substantially in the arc of a circle, said plate having its larger end of greater height and width than the diameter of said bulb and disposed centrally in front of said lamp bulb so as to entirely cover the bulb at the front, said plate terminating in front of said lamp socket, arms secured to the inner side of said plate and extending rearwardly at each side of said bulb, and a clamping ring to which said arms are connected adapted to be clamped on said lamp socket for holding the device in position.

In testimony whereof I affix my signature.

OSCAR NELSON.